United States Patent [19]

Randle

[11] 4,328,851
[45] May 11, 1982

[54] PNEUMATIC TIRE

[75] Inventor: James N. Randle, Atherstone, England

[73] Assignee: British Leyland UK Limited, London, England

[21] Appl. No.: 12,017

[22] Filed: Feb. 14, 1979

Related U.S. Application Data

[63] Continuation of Ser. No. 795,367, May 9, 1977, abandoned.

[30] Foreign Application Priority Data

May 21, 1976 [GB] United Kingdom ................. 7621011

[51] Int. Cl.$^3$ ............................................... B60C 5/00
[52] U.S. Cl. ........................ 152/330 RF; 152/352 A; 152/353 R
[58] Field of Search ............ 152/353 R, 353 C, 353 G, 152/352 R, 352 A, 330 RF, 209 NT, 209 R

[56] References Cited

U.S. PATENT DOCUMENTS 3,347,301 10/1967 Sidles .................................. 152/352
3,515,196 6/1970 Floria .................................. 152/352
3,841,375 10/1974 Edwards ....................... 152/330 RF
4,059,138 11/1977 Mirtain et al. .................. 152/353 R

FOREIGN PATENT DOCUMENTS 2425068 4/1975 Fed. Rep. of Germany ...... 152/330 RF
1435426 12/1966 France ........................... 152/353 R
1235147 6/1971 United Kingdom ........... 152/353 G

OTHER PUBLICATIONS

Mechanics of Pneumatic Tires, National Bureau of Standards, Nov. 1971, Clark, pp. 632, 631.

Primary Examiner—Michael W. Ball
Attorney, Agent, or Firm—Brisebois & Kruger

[57] ABSTRACT

A pneumatic tire of braced tread construction has a tread width which is less than its bead width. The sidewalls of the tire each have a flex area located nearer to the tire tread than to the tire bead, which flex area is adapted to exhibit relatively greater flexibility than surrounding areas of the sidewall. The tire is adapted to have a run-flat capability, being of radial ply construction for increased sidewall flexibility, and, when mounted on a wheel, incorporating a lubricant to lubricate areas of contact between the bead and tread regions of the tire when the tire is flat.

3 Claims, 3 Drawing Figures

U.S. Patent May 11, 1982 4,328,851
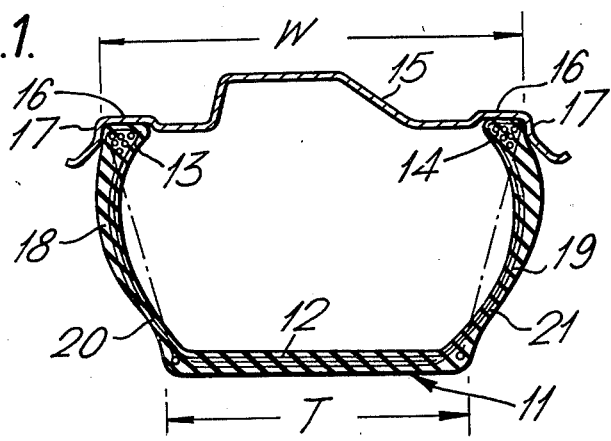
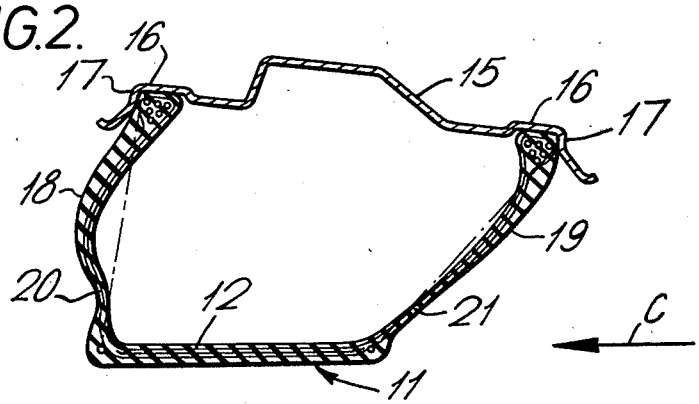
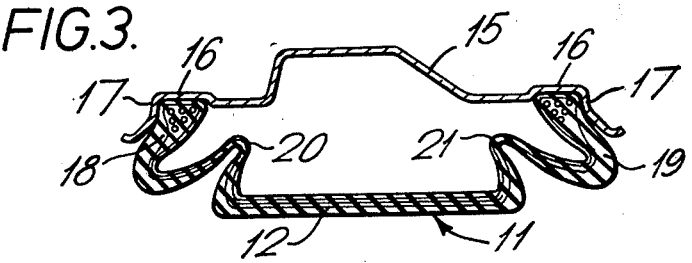

PNEUMATIC TIRE

This is a continuation, of application Ser. No. 795,367, filed May 9, 1977, now abandoned.

This invention relates to a pneumatic tire. In particular it is concerned with a tire of the type having a tread stabilized by a relatively inextensible belt in the carcass of the tire adjacent the tread. The belt is fabricated to have flexibility and to offer great resistance to stretching so restricting radial growth of the tire. The inextensible nature of the belt prevents it from distorting or flexing appreciably in any plane but at right angles to its surface. Hereafter a tire characterised by such a belt is referred to as of braced tread construction.

According to the present invention there is provided a pneumatic tire of braced tread construction having a tread width which is less than the bead width, and a flex area provided in that part of each side wall which lies nearer the tire tread than the tire bead.

For the purposes of this specification, the term "flex area" should be taken as referring to an area which is adapted to exhibit relatively greater flexibility than surrounding areas of the tire walls.

Preferably the tire is of radial ply construction.

In a preferred form of the invention a tire according to the present invention is mounted on a wheel and a lubricant is provided, which lubricant is adapted to be released into the tire cavity in the event of tire deflation. The lubricant acts to lubricate areas of contact between bead and tread regions of the tire. The lubricant may be secreted in capsules located in the tire cavity in a known manner.

An exemplary embodiment of the invention will now be described with reference to the accompanying drawing of a cross-section of a radial tire in which:

FIG. 1 shows a section of the tire according to the invention inflated and in normal running configuration;

FIG. 2 shows the effect of cornering forces on the tire of FIG. 1; and

FIG. 3 shows the result of deflation of the tire of FIG. 1.

All three figures show a section of a tire 11. The tire has a tread 12 of width T and beads 13, 14 having a width W overall, the width T being substantially less than the width W. The tire is mounted on wheel 15 with bead seats 16 and bead flanges 17.

The side walls 18, 19 of the tire are of varying thickness being thinnest in the radially outer side wall regions 20, 21 which constitute flex areas, and of increasing thickness in passing from the radially outer side walls to the beads 13, 14.

The bead wires serve as an anchorage for layers of carcass ply cords which run radially from bead 13 to bead 14 and back. Such cords are conventional in radial tires and are not described further. Likewise the tread stabilizing belt, which is provided in accordance with the invention, may be of conventional construction and is not described further.

FIG. 1 shows the normal running configuration of the tire when standing on a flat surface. In use on a cambered surface or under cornering the tire readily deforms sufficiently to overcome the effect of the camber without undue heat generation in the rotating tire due to cyclical deformation.

On cornering forces acting on the tire in the direction of arrow C (FIG. 2) the tread runs axially outwardly to the extent that side wall 19 progressively straightens so providing increasing resistance to the cornering force.

In the event of deflation of the tire the portion of tire on the road deforms to the configuration shown in FIG. 3. The regions 20, 21 in the radially outer side wall flex to allow controlled deformation of the tire so maintaining the tread centrally disposed relative to the wheel rim.

The tire is capable of providing improved ride qualities as compared to an equivalent conventional tire due to the nature of flexure of the sidewalls when ground surface irregularities are encountered. Moreover the tire construction according to the invention readily lends itself to the provision of a tire which can be run safely in a deflated state.

The invention may advantageously be incorporated in a tire according to the invention of our co-pending application of even date herewith concerning a tire having a tread stabilizing belt with a plurality of separate bands.

I claim:

1. A pneumatic tire with improved ride and handling characteristics comprising a pair of sidewals of substantially equal length interconnected by a tread portion, each said sidewall having a bead formed around the inner periphery of said sidewall; said tread being of braced tread construction so that the tread is relatively inextensible, and being of a width which is less than the width of the tire at said beads; each sidewall having a flex area of a thickness less than that of the remainder of the sidewall, in that annular half portion of the sidewall remote from the bead, and each sidewall, in a normal inflated condition of the tire, diverging with respect to said tread throughout a major portion of the distance between said tread and said beads, said sidewalls, flex area, and bead width cooperating with said braced tread to provide means for tilting the tread with respect to the axis of the tire in response to forces causing lateral deflection of the tread in either direction from a normal centered position with respect to the beads, and wherein said tire further comprises carcass cords extending from the bead of one sidewall to the bead of the other sidewall.

2. A tire according to claim 1, wherein said tire is of radial ply construction.

3. A pneumatic tire according to claim 1, wherein said braced tread construction comprises, a relatively inextensible flexible belt adjacent said tread and resistant to distortion in any plane except at right angles to the tread surface.

* * * * *